Patented Mar. 13, 1934

1,950,952

UNITED STATES PATENT OFFICE 1,950,952

MANUFACTURE OF PRIMARY DISAZO-DYESTUFFS AND THEIR PRODUCTION

Bernhard Richard, Basel, Switzerland, assignor to the firm of J. R. Geigy S. A., Basel, Switzerland No Drawing. Application May 31, 1932, Serial No. 614,617. In Switzerland October 11, 1931

8 Claims. (Cl. 260—76)

Diazo-compounds of aminoarylsulphonamides have not hitherto been used for the synthesis of primary disazo-dyestuffs from peri-aminohydroxynaphthalene sulphonic acids. By the present invention valuable dyestuffs of this group are made by coupling one molecular proportion of the diazo compound of an aminoarylsulphonamide, which may contain in the sulphonamide group one or two, eventually substituted hydrocarbon residues, in acid solution with a peri-aminohydroxynaphthalene sulphonic acid so as to produce a monoazo-dyestuff and then combining the monoazo dyestuff with a second molecular proportion of any desired diazo compound in an alkaline medium to produce a diazo-dyestuff. The diazo compounds of aminoarylsulphonamides combine very well with the peri-aminohydroxynaphthalene sulphonic acids even in a strongly acid solution.

By suitable choice of the diazo compounds it is possible to obtain dyestuffs which yield on wool dyeings which excel in respect of their fastness to fulling those of the hitherto known primary disazo-dyestuffs. The new dyestuffs have the following general formula:

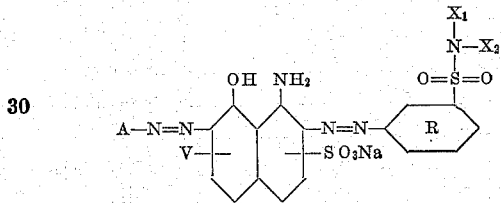

wherein A represents a residue of a benzene or naphthalene derivative, V represents H or SO₃Na, R may be substituted or not, $X_1$ represents H or alkyl and $X_2$ represents H, alkyl, aralkyl, aryl, arylsulphonic acid. They dye wool and silk fast reddish-blue to greenish-blue and blue-black shades and are absorbed very well even from a neutral dye bath containing Glauber salt.

The following examples illustrate the invention:—

Example 1

The diazo-solution obtained from 28.2 kilos of 1-chloro-2-amino-benzene-4-sulphanilide is introduced, whilst well stirring into a suspension of 31.9 kilos of freshly precipitated 1-amino-8-hydroxynaphthalene-3:6-disulphonic acid. Coupling is completed in the strongly acid suspension at 5–10° C. after several hours, the monoazo-dyestuff separating in mucilaginous form. The dyestuff is isolated after coupling is complete by warming, salting out and filtering. It is then stirred with hot water and an excess of sodium carbonate, whereupon it dissolves to a blue-red solution. Into the strongly alkaline solution thus obtained there is allowed to run gradually at 0–5° C. and whilst well stirring a diazo-solution prepared from 26.2 kilos of 1-methyl-4-aminobenzene-2-sulphanilide. When coupling is complete, the whole is heated and the dyestuff is salted out, filtered and dried.

Naturally the second combination can be conducted, without isolating the monoazo-dyestuff, in presence of an excess of sodium carbonate solution directly after the acid coupling and after neutralization of the reaction mixture with caustic soda or sodium carbonate.

The dyestuff obtained in accordance with this example has the following formula:

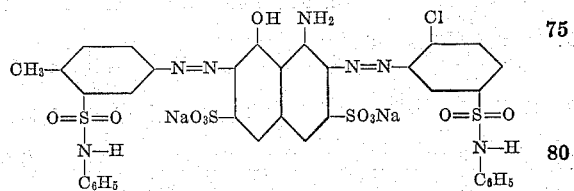

It is a bronze powder which dissolves in water to a blue solution and in concentrated sulphuric acid to a green solution. It dyes wool blue-black shades of excellent fastness to fulling and of very good fastness to light.

Example 2

The diazo-compound prepared from 26.3 kilos of the para-toluene sulphonic ester of the 1-amino-4-hydroxy-benzene is allowed to flow at 0–5° C. and whilst well stirring into an aqueous solution of the monoazo-dyestuff prepared as described in Example 1 containing an excess of sodium carbonate and 25 kilos of ammonia of 25 per cent strength. When coupling is complete the dyestuff is isolated in the usual manner. The new dyestuff has the following formula:

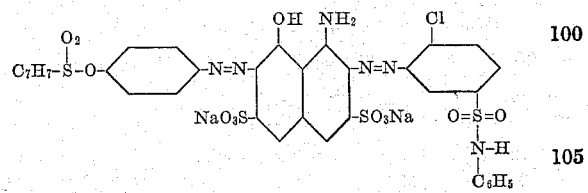

When dried it constitutes a bronze powder which is readily soluble in water to a blue solution and soluble in concentrated sulphuric acid to a green solution. It dyes wool reddish blue-black shades of very good fastness to fulling and to light; it is absorbed well from a neutral dye-bath containing Glauber salt.

Example 3

31 kilos of 1-chloro-4-aminobenzene-2-sulpho-N-ethylanilide (a crystalline substance of melting point 119° C., obtainable by reducing 1-chloro-4-nitro-benzene-2-sulpho-N-ethylanilide) are diazotized and the diazo solution is introduced into a suspension of 31.0 kilos of freshly precipitated 1 - amino - 8-hydroxynaphthalene-3:6-disulphonic acid whilst well stirring. When the coupling, which proceeds in the strongly acid medium at ordinary temperature, is completed, either the monoazo-dyestuff is isolated and redissolved for further combination in water, an excess of sodium carbonate and 20 kilos of ammonia of 25 per cent strength, or the acid reaction mixture is neutralized directly with caustic soda solution or sodium carbonate and then mixed with an excess of sodium carbonate and 20 kilos of ammonia of 25 per cent strength.

A diazo solution prepared form 19.9 kilos of 2-amino-2'-methyldiphenyl-ether is then allowed to run gradually at 5–10° C. and whilst well stirring into the alkaline solution of the monoazo-dyestuff prepared by either of the aforesaid methods. When coupling is complete the whole is stirred for several hours, then heated and the dyestuff salted out, separated by filtration and dried. The new dyestuff has the formula:

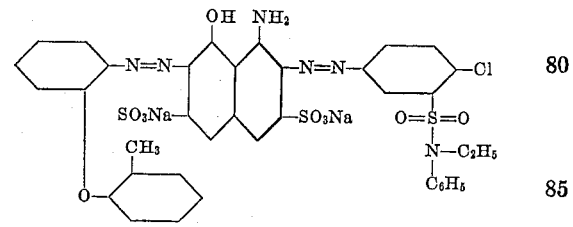

It constitutes a bronze powder which dissolves in water to a blue solution and in concentrated sulphuric acid to a green solution; it dyes wool greenish blue-black shades of excellent fastness to fulling and very good fastness to light.

The following table shows a number of other dyestuffs obtainable in accordance with the invention and the shades of their dyeings on wool:—

| | Dyestuff from— | | Coupled with— | Dyeing on wool in an acid bath |
|---|---|---|---|---|
| | The diazo compound (acid medium) of— | and the diazo compound (alkaline medium) of— | | |
| (1) | 1-chloro-2-amino-benezene-4-sulphamide | 4-chloro-2-amino-diphenyl-ether | 1-amino-8-hydroxynaphthalene-3:6-disulphonic acid. | Greenish blue-black. |
| (2) | 1 - chloro - 2 - amino - benzene - 4 - sulpho - dimethylamide. | ___do___ | ___do___ | Do. |
| (3) | 1-methyl-4-amino-benzene-2-sulphanilide | ___do___ | ___do___ | Blue-black. |
| (4) | 1-aminobenzene-3-sulphanilide | ___do___ | ___do___ | Do. |
| (5) | 1-methyl-4-aminobenzene-2-sulphanilide | 1-methyl-4-aminobenzene-2-sulphanilide. | ___do___ | Do. |
| (6) | 1-chloro-2-amino-benzene-4-sulphanilide | ___do___ | ___do___ | Do. |
| (7) | Do | 2-amino-2'-methyl-diphenyl-ether | ___do___ | Greenish blue-black. |
| (8) | Do | 2-chloro-1-amino-benzene | ___do___ | Blue-black. |
| (9) | Do | 4-chloro-2-amino-diphenyl-ether | ___do___ | Greenish blue-black. |
| (10) | 1 - chloro - 2 - amino - benzene - 4 - sulpho - 2' - methoxyanilide. | 2-amino-2'-methyl-diphenyl-ether | ___do___ | Do. |
| (11) | 1-chloro-2-amino-benzene-4-sulphanilide | 4-amino-diphenyl-ether | ___do___ | Greenish black-blue. |
| (12) | 1-chloro-2-amino-benzene-4-sulpho-monobenzylamide. | p-toluene-sulphonic acid ester of 1-amino-4-hydroxy-benzene. | ___do___ | Reddish blue-black. |
| (13) | 1 - chloro - 2 - amino - benzene - 4 - sulpho - 4' - methyl-anilide. | Para-toluene sulphonic acid ester of 1-amino-4-hydroxy-benzene. | ___do___ | Do. |
| (14) | 1-chloro-2-amino-benzene-4-sulpho-N-ethyl-anilide (melting point 112.5° C.) | 4-chloro-2-amino-diphenyl-ether | ___do___ | Greenish blue-black. |
| (15) | Do | p-toluene-sulphonic-ester of 1-amino-4-hydroxybenzene. | ___do___ | Blue-black. |
| (16) | Do | 2-amino-2'-methyl-phenyl ether | ___do___ | Greenish blue-black. |
| (17) | 1-chloro-4-amino-benzene-2-sulphanilide (melting point 152° C.) | ___do___ | ___do___ | Do. |
| (18) | Do | Para-toluene-sulphonic ester of 1-amino-4-hydroxybenzene. | ___do___ | Reddish blue-black. |
| (19) | 1-chloro-4-amino-benzene-2-sulpho-N-ethyl-anilide (melting point 119° C.) | ___do___ | ___do___ | Do. |
| (20) | Do | 2-amino-2'-methyl-diphenyl-ether | ___do___ | Greenish blue-black. |
| (21) | 1-methoxy-2-aminobenzene-4-sulphanilide | ___do___ | ___do___ | Blue-black. |
| (22) | 2 - amino - 4' - methyl - diphenylsulphone - 4-sulpho-N-ethyl-anilide (melting point 107–108° C. obtained by condensation of 2-nitro-1-chlorobenzene-4-sulpho-N-ethyl-anilide with paratoluene-sulphinic acid and subsequent reduction). | Para - toluene - sulphonic ester of 1-amino-4-hydroxybenzene. | ___do___ | Do. |
| (23) | 2 - amino - 4' - methyl - diphenylsulphone - 4-sulpho-N-ethyl anilide (melting point 107–108° C. obtained by condensation of 2-nitro-1-chloro-benzene-4-sulpho-N-ethyl-anilide with paratoluene-sulphinic acid and subsequent reduction). | 2-chloro-1-amino-benzene | ___do___ | Greenish blue-black. |
| (24) | 1-chloro-2-amino-benzene-4-sulphanilide | β-naphthyl-amine | ___do___ | Do. |
| (25) | Do | α-naphthyl-amine | ___do___ | Green-black. |
| (26) | 1-chloro-2-amino-benzene-4-sulphanilide | 2-amino-2'-methyl-diphenyl-ether | 1-amino-8-hydroxy-naphthalene-4:6-disulphonic acid. | Blue-black. |
| (27) | 1-methyl-4-amino-benzene-2-sulphanilide | 4-chloro-2-amino-diphenyl-ether | ___do___ | Reddish blue-black. |
| (28) | Do | 1 - methyl - 4 - amino - benzene - 2 - sulphanilide. | ___do___ | Do. |
| (29) | 1-chloro-2-amino-benzene-4-sulphanilide | 2-amino-1-diphenylether-4-sulphonic acid. | 1-amino-8-hydroxy-naphthalene-4-monosulphonic acid. | Reddish black. |
| (30) | 1-chloro-2-amino-benzene-4-sulphanilide-3-sulphonic acid. | 4-chloro-2-amino-diphenyl-ether | ___do___ | Do. |

$$Cl-\underset{1}{\underset{|}{\bigcirc}}\overset{NH_2}{\underset{4}{\bigcirc}}-SO_2-NH-\underset{3}{\bigcirc}-SO_3H$$

What I claim is:—

1. A process for the manufacture of primary disazo-dyestuffs, consisting in coupling one molecular proportion of a peri-aminohydroxynaphthalene sulphonic acid in acid solution with a diazo compound of one molecule of an aminarylsulphonamide of the benzene series so as to produce a monoazo-dyestuff and then combining the latter with a second molecular proportion of an aromatic diazo compound in alkaline solution to produce a disazo-dyestuff.

2. A process for the manufacture of primary disazo-dyestuffs, consisting in coupling one molecular proportion of a peri-aminohydroxynaphthalene sulphonic acid in acid solution with a diazo compound of one molecule of an aminoarylsulphonamide of the benzene series which contains at least one alkyl, aralkyl or aryl radical of the benzene series in the sulphonamide group so as to produce a monoazo-dyestuff and then combining the latter with a second molecular proportion of an aromatic diazo compound in alkaline solution to produce a disazo-dyestuff.

3. A process for the manufacture of primary disazo-dyestuffs, consisting in coupling one molecular proportion of a peri-aminohydroxynaphthalene sulphonic acid in acid solution with a diazo compound of one molecule of an aminosulphonamide of the benzene series, in which one hydrogen of the sulphonamide group is replaced by a radical of the benzene series and the other hydrogen may be substituted by an alkyl, aralkyl or aryl radical, so as to produce a monoazo-dyestuff, and then combining the latter with a second molecular proportion of an aromatic diazo compound in alkaline solution to produce a disazo-dyestuff.

4. A process for the manufacture of primary disazo-dyestuffs, consisting in coupling one molecular proportion of a peri-aminohydroxynaphthalene sulphonic acid in acid solution with a diazo compound of one molecule of an aminoarylsulphonamide of the benzene series which contains two alkyl radicals, or two of the aralkyl and aryl radicals of the benzene series in the sulphonamide group so as to produce a monoazo-dyestuff and then combining the latter with a second molecular proportion of an aromatic diazo compound in alkaline solution to produce a disazo-dyestuff.

5. A process for the manufacture of a primary disazo-dyestuff, consisting in coupling 1-chloro-2-amino-benzene-4-sulphanilide in acid medium with 1-amino-8-hydroxynaphthalene-3:6-disulphonic acid and combining the product obtained in alkaline medium with 1-methyl-4-aminobenzene-2-sulphanilide so as to produce a disazo-dyestuff having in form of its sodium salt the following formula:

6. A process for the manufacture of a primary disazo-dyestuff, consisting in coupling 1-chloro-2-amino-benzene-4-sulphanilide in acid medium with 1-amino-8-hydroxynaphthalene-3:6-disulphonic acid and combining the product obtained in alkaline medium with the para-toluene sulphonic ester of 1-amino-4-hydroxybenzene so as to produce a disazo-dyestuff having in form of its sodium salt the following formula:

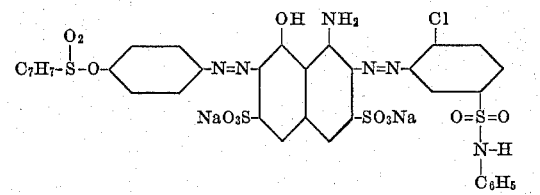

7. A process for the manufacture of a primary disazo-dyestuff, consisting in coupling 1-chloro-4-amino-benzene-2-sulpho-N-ethylanilide in acid medium with 1-amino-8-hydroxynaphthalene-3:6-disulphonic acid and combining the product obtained in alkaline medium with 2-amino-2'-methyldiphenylether so as to produce a disazo-dyestuff having in form of its sodium salt the following formula:

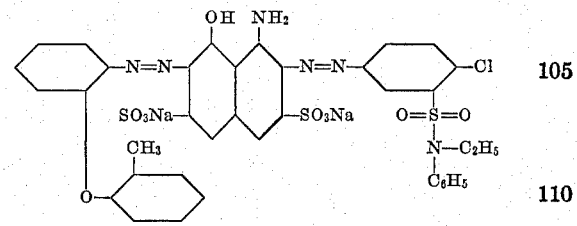

8. The primary disazo-dyestuffs having the following general formula:

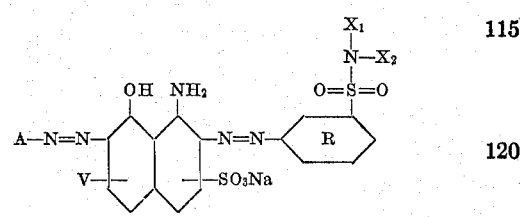

wherein A represents a radical of the benzene or naphthalene series, V represents H or $SO_3Na$, R may be phenyl, or phenyl substituted by alkyl, O-alkyl, halogen, $SO_2C_6H_5$, or $SO_2C_7H_7$, $X_1$ represents H or alkyl and $X_2$ represents H, aryl, aralkyl, arylsulphonic acid of the benzene series, said dyestuffs dissolving in water to a substantial blue solution and in concentrated sulphuric acid to a substantial green solution and dyeing wool and silk reddish-blue to greenish-blue and blue-black shades fast to fulling and to light.

BERNHARD RICHARD.